April 16, 1929.  J. F. SEELBACH  1,709,492

SASH PULLEY WHEEL

Filed Dec. 27, 1927

INVENTOR
John F. Seelbach
BY Chappell & Earl
ATTORNEYS

Patented Apr. 16, 1929.

1,709,492

UNITED STATES PATENT OFFICE.

JOHN F. SEELBACH, OF GRAND RAPIDS, MICHIGAN, ASSIGNOR TO GRAND RAPIDS HARDWARE COMPANY, OF GRAND RAPIDS, MICHIGAN.

SASH PULLEY WHEEL.

Application filed December 27, 1927. Serial No. 242,537.

This invention relates to improvements in sash pulley wheels. The invention, however, is capable of broader application.

The objects of the invention are:

First, to provide an improved simple and economical construction of sheet metal sash pulley.

Second, to provide an improved means of retaining the hub or bushing in such a pulley.

Objects pertaining to details and economies of my invention will definitely appear from the description to follow.

I accomplish the objects of my invention by the devices and means described in the following specification. The invention is clearly defined and pointed out in the claims.

A device embodying my invention is clearly illustrated in the accompanying drawing in which.

Figure 1:
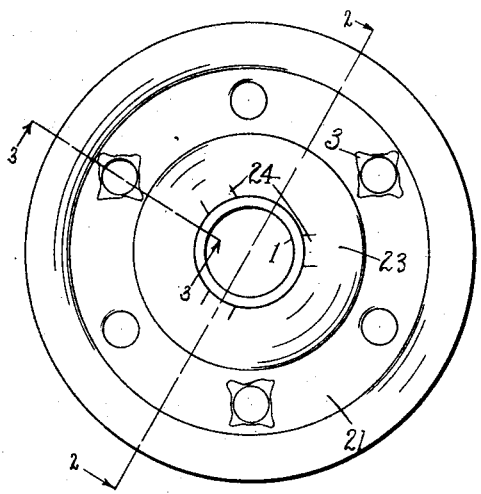
Fig. 1 is a side elevation view of a sash pulley embodying the features of my invention.
Figure 2:
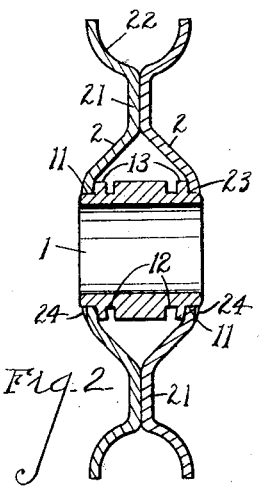
Fig. 2 is a detail transverse sectional view on line 2—2 of Fig. 1 showing details of the hub securing means.
Figure 3:
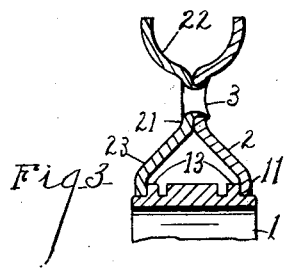
Fig. 3 is a detail sectional view on line 3—3 of Fig. 1 showing other details.
Figure 4:
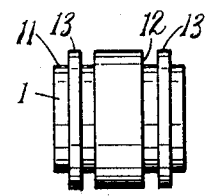
Fig. 4 is a detail elevation view of the hub or bushing.

The parts will be identified by their numerals of reference which are the same in all views.

1 is the hub or bushing. 2, 2 are the metal side plates of the wheel forming a web 21 and a sash cord groove 22 in the periphery and expanded at 23 to form hub engaging flanges. The hub 1 is provided with end shoulders 11 to receive the sheet metal sides which are perforated to correspond with the same. An annular groove 12 is cut within the shoulder forming a yieldable annular rib 13 toward each end of the hub or bushing.

The parts are assembled with a drive fit and the sheet metal sides of the pulley are joined together by eyelets 3, rivets or any suitable means. The center flanges are crowded to place, being a drive fit, on the hub or bushing. The center flanges 23 are indented at 24 preferably at three points equidistant around the hub. The projecting annular rib 13 is broken down by the action of the tool which makes this depression and makes a very secure retaining means for the said hub or bushing. A lesser number of depressions might be used. The depressions might be confined to one end of the hub or bushing. I prefer, however, to put the same at both ends which makes a very complete and very strong wheel without the necessity of any riveting or other securing of the hub or bushing in place. The hub is preferably of metal but can be of any suitable material.

As indicated, the pulley is capable of considerable modification without departing from my invention.

I desire to claim the invention broadly as well as specifically as pointed out in the appended claims.

Having thus described my invention what I claim as new and desire to secure by Letters Patent is:

1. In a sash pulley wheel, the combination of a hub or bushing shouldered at each end and having a groove formed within the shoulder to provide projecting annular ribs within the shoulders, sheet metal halves for the pulley conformed to form the sash cord groove and hub flanges, and driven on to the said hub and indented into the said annular ribs as specified.

2. In a sash pulley wheel, a hub with annular rib, a sheet metal side embracing said hub and indented and upset into said annular rib.

In witness whereof I have hereunto set my hand.

JOHN F. SEELBACH.